United States Patent [19]

Young

[11] Patent Number: 5,360,195
[45] Date of Patent: Nov. 1, 1994

[54] POWER ASSISTED ADJUSTMENT SYSTEM

[76] Inventor: Sheldon E. Young, 1141 Indian Trail, Hinsdale, Ill. 60521

[21] Appl. No.: 30,919

[22] Filed: Mar. 15, 1993

[51] Int. Cl.⁵ ............................................. F16M 13/00
[52] U.S. Cl. ................................... 248/550; 248/188.4
[58] Field of Search ............... 248/550, 188.4, 180, 248/638, 615, 634, 632, 188.2

[56] References Cited

U.S. PATENT DOCUMENTS

| | | | |
|---|---|---|---|
| 2,706,607 | 4/1955 | Withers | 248/550 |
| 3,332,647 | 7/1967 | Young | 248/615 |
| 3,455,526 | 7/1969 | Orii | 248/188.4 UX |
| 3,592,423 | 7/1971 | Mui | 248/188.4 X |
| 3,807,034 | 4/1974 | Albertovich | 248/188.4 X |
| 3,931,947 | 1/1976 | Tagnon | 248/180 |
| 4,047,427 | 9/1977 | Young | 73/141 A |
| 4,265,136 | 5/1981 | Riegler | 248/550 X |
| 4,489,991 | 12/1984 | Delam | 248/638 X |
| 4,846,436 | 7/1989 | Young | 248/542 |
| 5,018,702 | 5/1991 | Roser | 248/180 X |
| 5,127,622 | 7/1992 | Whelpley | 248/638 X |
| 5,141,201 | 8/1992 | Mizuno | 248/638 X |

Primary Examiner—J. Franklin Foss
Attorney, Agent, or Firm—R. Jonathan Peters

[57] ABSTRACT

The invention relates to a power assisted adjustment system for assuming and maintaining a load member, and comprises a force-responsive means operably connected with an adjustment means, for assuming a load, and an actuable load-relieving means for temporarily reducing the load on the adjustment means. Application of force or torque to the force-responsive means actuates the load-relieving means thereby relieving load on the adjustment means, and substantially concomitantly operably effects a desired adjustment of the adjustment means.

21 Claims, 7 Drawing Sheets

POWER ASSISTED ADJUSTMENT SYSTEM

FIELD OF THE INVENTION

This invention relates to a power assisted adjustment system used for adjusting a load. In its more specific aspect, this invention relates to a power assisted adjustment system for adjusting, assuming, positioning, leveling, supporting, clamping, or compressing a load member facilitated by the application of a relatively small force which substantially concomitantly actuates a load-relieving means and adjusts the load position.

BACKGROUND AND PRIOR ART

Extremely heavy loads such a machinery, equipment, presses, buildings, bridges, etc., are subjected to shock and vibration and are susceptible to misalignment due to these forces and/or due to settling including settling of the foundation. Proper alignment, including leveling, flatness, compression, and the like, is essential in order to operate efficiently, economically and safely. The prior art discloses a number of adjustable mountings to correct for out-of-level or out-of-flatness conditions. This prior art includes U.S. Pat. Nos. 3,332,647 to Young; 4,047,427 to Young; and 4,846,436 to Young et al., which disclose an adjustment member engagable with a support member for the machine footing and maintained in spaced relationship from a bearing member. In U.S. Pat. No. 4,846,436, a hydraulic cylinder is disposed between the support member and bearing member, and when actuated relieves at least a portion of the load assumed by the adjustment member. The adjustment member can now be turned or rotated to adjust the out-of-level condition, and once corrected, the cylinder can be drained and the load returned to the adjustment member.

U.S. Pat. No. 4,489,991 to Delam discloses a support system for machines such as a turbogenerator connected by a common drive shaft and arranged on a base plate comprising a hydraulic cylinder and spring means for regulating or adjusting any spatial relationship between members, and then a blocking device or wedge is inserted to fill the space and decrease the load on the regulating members.

U.S. Pat. No. 3,807,034 relates to a screw mechanism that adjusts the elevation of two adjacent corners of a table simultaneously and equally by means of one control. The hydraulic cylinder relieves the load on the screw mechanism to make it easier to turn.

In accordance with the teachings of the aforesaid U.S. patents, the hydraulic cylinder is first actuated to lift a portion of the load; and then as a second, separate step the adjustment member or spacer is adjusted; and in a third step, the hydraulic cylinder is deactivated. In each situation, the lifting means (e.g. jack) is actuated separately from the adjustment means; that is, there is no teaching or suggestion that one function is actuated in direct response to another function—there is no force feedback actuation. When a mounting is to be adjusted, these three separate steps or functions frequently have to be repeated at each mounting point in order to achieve any change or adjustment in elevation. Although support systems or mountings of this type have been successful commercially, they are nevertheless time consuming, difficult to manipulate particularly in obtaining a very precise or accurate adjustment, and expensive.

SUMMARY OF THE INVENTION

In accordance with the present invention, there is provided a power assisted adjustment system for assuming or bearing a load member in a desired condition, which system operates with a minimum of effort and input, and hence is simple, fast, and inexpensive, thereby overcoming the disadvantages of prior art systems which are cumbersome, expensive, and slow. The adjustment system comprises a force-responsive means or actuator means in combination with an adjustment means, adaptable for assuming a load, and an actuable load-relieving means for temporarily reducing or relieving the load on the adjustment means, thereby permitting adjustment of extremely heavy loads with a nominal input force to the actuator means. Thus, actuator means or force-responsive means is operably connected to the adjustment means and to an actuating means for actuating the load-relieving means. Application of input force or torque to the force-responsive means actuates the load-relieving means to take up an increasing portion of the load and thus increasingly relieve the load from the adjustment means, and substantially concomitantly operably effects a desired adjustment of the adjustment means. When the input force is stopped or interrupted, the load-relieving means is deactivated and ceases to assume the portion of the load taken up, and that portion of the load is returned or transferred back to the adjustment means. Input force to the force-responsive means is nominal relative to the load, and thus it is possible, for example, to adjust by hand the positioning of extremely heavy machinery, equipment or structures weighing a hundred tons or more. For example, machines, buildings, bridges and the like weighing several millions of pounds can be raised, lowered or leveled simply by applying manually applied forces of a few pounds to the actuator means. Similarly, a clamping or compressing force of millions of pounds, such as with several members of a machine being clamped together, may be adjusted in the same manner. As used herein and in the appended claims, adjustment of a load is intended to include positioning, leveling, assuming, bearing, supporting, clamping, compressing, or the like, of a load.

It should be understood that the term "concomitantly" as used herein and in the appended claims is not intended to mean that application of a torque actuates the load-relieving means and adjusts the adjustment means at precisely the same instance, but rather that these two functions occur without substantial interruption and with essentially no or very little perceptible time lag, that is with a time lag that is so nominal or negligible as to be insignificant. Because these two functions (i.e., load-relieving and adjusting) occur substantially concomitantly, it is possible to accomplish both functions with the application of input force that is nominal relative to the load, e.g. weight of the load. The invention is therefore useful in a single step process for adjusting a load mounting system by applying force to the force-responsive means, which force is nominal relative to the load, and thereby substantially concomitantly (i) actuating the load-relieving means to relieve temporarily at least a portion of the load on the adjustment means, and (ii) effecting a desired adjustment of the adjustment means.

The adjustment means includes any adjustment device used for bearing heavy loads, and may include, for example, a level-adjustment screw, wedging means, and the like useful for supporting machines, buildings, bridges, etc., and connecting means or assembling means such as a tie rod nut for adjustably engaging a complementary tie rod and the like useful for fastening, compressing, or clamping adjustable devices bearing heavy loads.

The actuator means or force-responsive means is operably connected to the adjustment means, which connection may be temporary or permanent as explained below in greater detail, and force or torque applied to the actuator means is transferred to the adjustment means. However, force or torque transferred to the adjustment means is not sufficient to effect the desired adjustment without auxiliary means for relieving load assumed by the adjustment means. Thus, in accordance with my invention, application of relatively small force or torque to the actuator means actuates the load-relieving means which assumes an increasing amount of the load thereby relieving load on the adjustment means, and force or torque transferred substantially concomitantly to the adjustment means effects the desired adjustment. When the desired adjustment is achieved, the force or torque is terminated thereby deactivating the load-relieving means and transferring back fully the load to the adjustment means. Suitable load-relieving means includes a hydraulic cylinder, although it should be understood that the invention is not limited thereto.

In one embodiment of the invention, the force-responsive means comprises a rotatable member engagable with a substantially cylindrical adjustment member having an externally threaded portion threadedly engagable with the load. The rotatable member is rotatable relative to the adjustment member between an activating position and a non-activating position. A suitable sensing means is operably connected to the rotatable member for transmitting a signal to an actuating means for actuating the load relieving means such as a hydraulic cylinder operated by a suitable control means upon an appropriate signal from the sensing means. For example, the sensing means may comprise an appropriate switch means electrically connected to a motor-operated pump for delivery of pressurized fluid to a cylinder, e.g. pressurized oil to a hydraulic cylinder, for relieving the load. Other suitable sensing means include a strain gauge, piezo electric device, proximity transducer, or other known signal generating devices for transmission by one or more electric wires or by radio to a controller for controlling the activation or operation of the load-relieving means, but it should be understood that the type of sensing means selected will depend upon the structure of the force-responsive means. Thus, rotation of the rotatable member to an activating position, e.g. to activate the switch and close an electric circuit, activates the load-relieving means to relieve the load on the adjustment member, and a suitable coupling means or clutch engages or couples the rotatable member with the adjustment member to effect adjustable rotation of the adjustment member. In this manner, application of input force to the force-responsive means substantially concomitantly actuates the load-relieving means and effects the desired rotational adjustment of the adjustment member in order to level the load or otherwise distribute the weight. Suitable bias means operably connected with the rotatable member returns it to a neutral position when the input force is interrupted, and the load is returned to the adjustment member.

In accordance with an alternative embodiment of the invention, the actuator means or force-responsive means includes a valve means adapted to establish fluid communication between a source of hydraulic fluid under pressure and the load-relieving means. Application of force or torque to the actuator means opens the valve means permitting pressurized fluid to flow from the source to the load-relieving means thereby reducing the load on the adjustment means. A continued application of torque to the actuator means or force-responsive means adjusts the relative positioning of the load, and when torque is removed, the load is transferred back to the adjustment means.

In yet another embodiment of the invention, the adjustment system includes an annular actuator head arranged axially with reference to the adjustment member, and has a plurality of radial arms or spokes extending from a hub for operably connecting the actuator head to the adjustment means. Disposed on one of the arms is a suitable strain guage comprising a resistance wire extremely sensitive to any change in length. Torque applied to the force-responsive means is imposed on the arm at the location of the strain gauge thereby changing the length of the wire and consequently its electrical resistance, which results in an electrical signal being transmitted for activating the load relieving means. The weight or load on the adjustment means is relieved, and contiued turning of the actuator head adjusts the adjustment member with only nominal force.

DETAILED DESCRIPTION OF THE INVENTION

Figures 1, 2, 4:
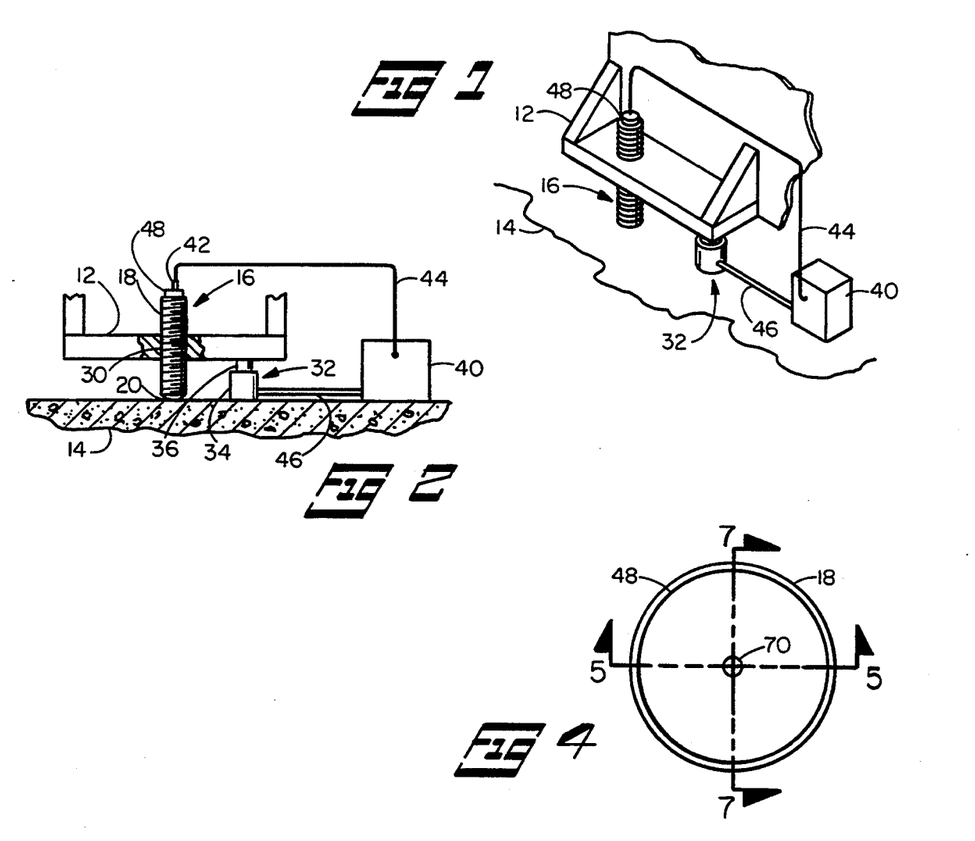
FIG. 1 is a diagrammatic, perspective view of a power assisted adjustment system used in conjunction with a machine footing and embodying the features of the present invention.
FIG. 2 is a fragmentary elevational view, partly in cross-section, showing the power assisted adjustment system of FIG. 1 in greater detail.
FIG. 4 is a plan view of FIG. 3.
Figures 3, 5:
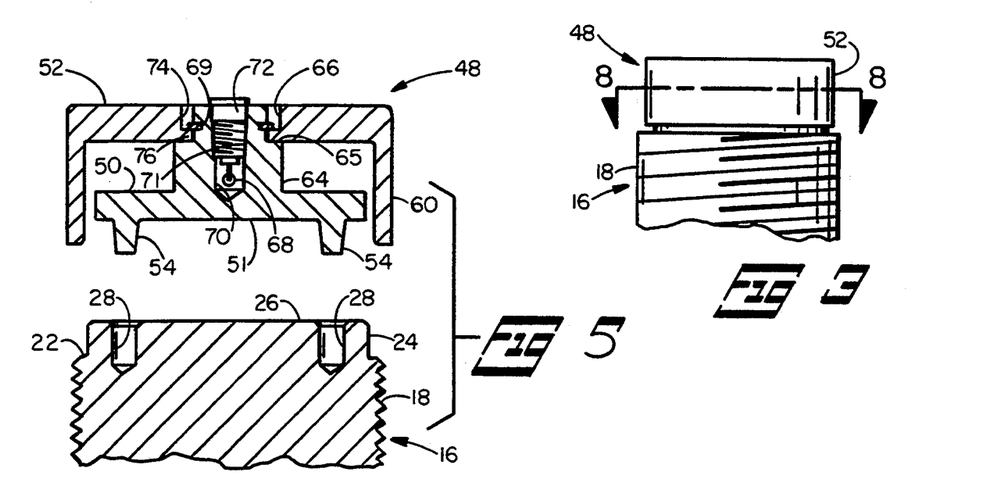
FIG. 3 is an enlarged, fragmentary elevational view of an adjustment member and actuator head utilized in a power assisted adjustment system of the type shown in FIG. 1.
FIG. 5 is an enlarged, exploded, longitudinal sectional view taken on live V—V of FIG. 4 showing details of the adjustment member and actuator head.

FIGS. 1 and 2 diagrammatically illustrates a power assisted adjustment unit for load bearing members, which incorporates the features of the invention. In the drawings, wherein like reference numerals designate similar parts throughout, there is illustrated in FIGS. 1 and 2 a machine mounting unit such as to correct for out-of-level and/or out-of-flatness condition, and load member 12, shown in fragmentary view, may be a corner foot of a heavy machine to be adjustably spaced from a base member 14, such as the floor of a building. Although there is illustrated a single adjustment unit, it should be understood that the same unit can be used at each of the various mounting points of a machine, e.g. at each of the four corner feet of a machine, for leveling and fine-tuning the distribution of support for the entire machine. An adjustment member, indicated generally by the numeral 16, adaptable for bearing the load, and having its longitudinal axis substantially transverse to the load, comprises an externally threaded, cylindrical body portion or section 18 of a first diameter extending from a bearing portion 20 at the bottom end thereof and terminating at the top or upper portion with annular shoulder 22 (see FIG. 5) and upwardly extending, cylindrical shank 24 of a reduced or second diameter having a transverse, planar surface 26 for effecting seating contact with the actuator head indicated generally at 48, as explained hereinbelow in detail. This planar surface 26 of the shank section 24 is provided with opposed, spaced apart recesses or holes 28, preferably two such recesses, spaced inwardly from the periphery of the shank section. Adjustment member 16 is seated at its lower end or bearing end 20 upon base member 14, e.g., building floor, and the threaded section 18 threadedly engages internally threaded aperture 30 of load member 12 for axial rotatable engagement. In this manner, adjustment member 16 is rotatable relative to the load and in fixed relation to the base member, as explained below in detail. It thus will be observed that because adjustment member 16 is seated on a stationary member, e.g., floor 14, and also threadedly engaged with the load, rotation of adjustment member 16 will raise or lower load member 12 and thereby correct for out-of-level or out-of-flatness condition.

Load-relieving means, indicated generally by the numeral 32, such as a hydraulic cylinder having a cylinder 34 and piston 36 of conventional design and operation, is seated on base member 14 adjacent the adjustment member 16 and positioned beneath load member 12 and oriented to engage a surface or side of the load, e.g. bottom. The load-relieving means 32 is actuated in response to a signal transmitted by suitable sensing means, indicated generally by the numeral 38 (see FIG. 8), to an electrically connected control means 40, such as a motor-operated pump, having suitable connecting elements including male electrical connector 42, electric cable 44 and conduit 46, described below in greater detail. When piston 36 of the hydraulic cylinder is actuated in response to a signal, as described below, a load-relieving force is exerted against the load member 12, e.g. against the bottom surface, thereby reducing or relieving the load on adjustment member 16. If desired, more than one load-relieving means may be utilized at each location, e.g. each corner foot of a machine, in which case all of the load-relieving means can be connected by suitable connecting elements with the control member, substantially as shown with the alternative embodiment in FIG. 10 and described below in more detail. A plurality of load-relieving means provides a more uniform distribution of the load-relieving force on both sides of the adjustment member.

Force-responsive means comprising an actuator head, indicated generally by the numeral 48, is co-axially mounted with respect to the longitudinal axis of adjustment member 16, and includes a torquing plate 50 engagable with rotatable member or annulus 52, and is operably connected to the adjustment member and to the actuating means for actuating the load-relieving means 32. The torquing plate 50 has a substantially flat or planar surface 51, for mating with planar surface 26, and downwardly depending, opposed fingers 54 for registering with complementary recesses 28 of shank 24 thereby engagably mounting the torquing plate with the adjustment member 16. Further, the torquing plate is provided with opposed apertures 56 and 58 spaced approximately 90° from the fingers 54 when viewed from a plan view; that is, on horizontal axes normal to each other on the same plane, the fingers 54 depend along one axis and the apertures 56 and 58 are provided on the other axis. Further, aperture 58 is provided with an annular enlarged portion having shoulder 57 and lateral side wall 59.

The rotatable member or annulus 52 is co-axially arranged with the torquing plate 50 and has a downwardly depending skirt 60, and further is of greater diameter than the torquing plate so when mounted thereover provides a mount housing for the torquing plate. Rotatable member 52 has opposed downwardly depending pins 62 and 63 spaced inwardly of the skirt and are of smaller diameter than apertures 56 and 58 which accommodate pins 62 and 63, respectively. Thus, it will be observed that in assembling the rotatable member and torquing plate, pins 62 and 63 are brought into registry with apertures 56 and 58, respectively, and are inserted therein, and the interior wall of the skirt 60 is spaced from the marginal edge of the torquing plate 50 so that the rotatable member 52 is free to rotate relative to the torquing plate, as explained below in detail.

Torquing plate 50 is provided with a centrally disposed, upwardly extending boss 64 terminating with an inwardly extending annular shoulder 65 and an upwardly extending neck 66, which is of smaller diameter than the boss. The neck is provided with a circumferential groove or channel 67 for accommodating a split ring or retaining ring 69. Radial open-ended bore 68 extends from the marginal wall of the cylindrical boss 64 and terminates at its opposite end at central bore 70 having an internally threaded portion 71 to accept a female electrical receptacle or socket 72 for accommodating a male electrical connector 42. Thus, central bore 70 extends co-axially with the torquing plate 50 upwardly through the boss 64 and opening at the neck 66 for accommodating female electrical receptacle 72 for receiving male electrical connector 42 to which is attached electric cable 44. Rotatable member 52 has a centrally disposed bore or opening 74, for accommodating the neck section 66 of the torquing plate 50, and bore 74 is provided with a reduced section thereby defining an inwardly directed, laterally projecting annular flange 76 for seating on annular shoulder 65 of boss 64.

Figures 6A, 6B, 7, 8:
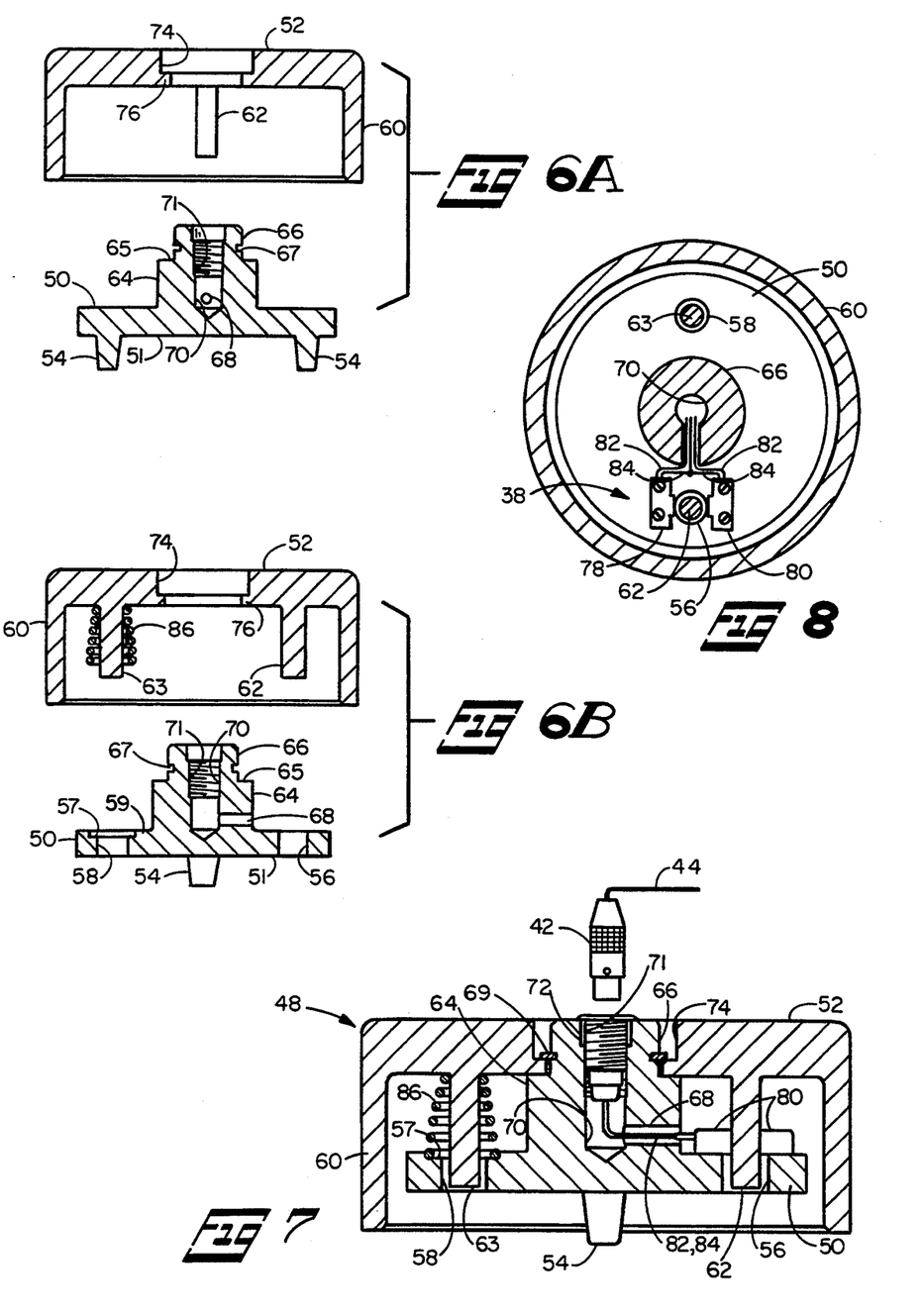
FIG. 6A is an exploded longitudinal sectional view of the actuator head
FIG. 6B an exploded longitudinal sectional view of the actuator head shown in FIG. 6A rotated 90°.
FIG. 7 is an enlarged cross-sectional view on line VII—VII of FIG. 4.
FIG. 8 a plan sectional view taken on line VIII—VIII of FIG. 3.

As shown in FIG. 7, rotatable member 52, having a shell form in cross-section and may have an annular or polygonal configuration as a plan view, is of greater diameter than torquing plate 50 so as to be mounted thereover and spaced therefrom. In assembling these two members of the actuator head, the neck portion 66 of boss 64 is inserted into central bore 74, annular flange 76 seats on shoulder 65 of boss 64, and depending pins 62 and 63 are inserted into apertures 56 and 58, respectively. Split ring 69 is inserted into annular groove 67 abutting the top surface of annular flange 76, and is fastened in place, thereby engaging the torquing plate and rotatable member, but the split ring engagement permits the rotatable member to rotate relative to the torquing plate. The actuator head can now be mounted to the adjustment member 16 by inserting depending fingers 54 of the torquing plate into recesses 28 of shank 24 thereby bringing planar surfaces 26 and 51 into mating engagement and providing a fixed or rigid engagement between the actuator head and the adjustment member.

The actuator head has incorporated therein sensing means 38, which is operatively connected with the control means 40, whereby application of input force to the actuator head actuates the load-relieving means to relieve at least a portion of the load from the adjustment member. As shown in FIG. 8, the sensing means 38 comprises two contact switches 78 and 80 attached or mounted to the top surface of the torquing plate 50 at opposite sides of aperture 56 and adjacent therewith such that suitable switch tabs protrude into the opening from opposite directions but not in contact with pin 62 when the actuator head is in a neutral or central position. When torque is applied to turn rotatable member 52 in either direction, the depending pins 62 and 63 rotate with member 52 while torquing plate 50 remains stationary or at rest, and pin 62 will contact one or the other of the switch tabs to actuate switch 78 or 80. Because apertures 56 and 58 are larger in diameter than the pins 62 and 63 which extend into apertures 56 and 58, the pins, upon rotation of member 52, will abut the side walls of the apertures thereby arresting or stopping rotation of member 52 independent of torquing plate 50. Thus, because of this stop means, torque applied to the rotatable member is transferred to the torquing plate, which is fixedly engaged or coupled to adjustment member 16, and thereby transmits torque to the adjustment member. Lead wires or conductors 82 and 84 extend from contact switches 78 and 80, respectively, to the female receptacle 72 for electrical contact with the connector 42. Coil spring 86 surrounds pin 63 and at one end is supported by the seat defined by shoulder 57 and lateral side wall 59 and at its opposite end abuts the underside of the rotatable member. It will be observed that spring 86 biases the rotatable member to a center or neutral position relative to the torquing plate when no torque or force is applied to the actuator head.

With the actuator head 48 assembled and rigidly mounted to the adjustment member 16, as described above, an input force or torque to the actuator head 48, as by turning the rotatable member 52 clockwise or counterclockwise, closes the circuit thereby actuating load-relieving means 32 and relieving the load, and substantially concomitantly torque is transmitted to the adjustment member 16 to effect adjustment thereof. It will be observed that rotation of rotatable member 52 resulting from the application of torque to member 52 will bring pin member 62 into contact with either switch 78 or 80, depending upon the direction of rotation, thereby closing the circuit and sending a signal to control member 40. Suitable means for biasing the actuator head to a non-activating position comprises coil spring 86 mounted on the oppositely disposed pin member 63 between the bottom surface of the rotatable member and the upper surface of the torquing plate. The spring is preadjusted so as to be overcome by appropriate torque applied to rotatable member 52, but is of sufficient tension so as to break contact with the switches 78 or 80 when application of torque is interrupted. Thus, by reason of the signalling means 38, initial torque applied to the force-responsive means 48 by turning the rotatable member 52 in a clockwise direction closes switch 80 and sends a signal by electrical conductor 82 via receptacle 72 to connector 42, and then via electric cable or conductor 44 to control member 40 to actuate a pump member for supplying pressurized, hydraulic fluid, e.g. oil, via conduit 46 to the load-relieving means 32, e.g. hydraulic cylinder.

In the power assisted adjustment unit as shown in FIG. 1, a suitable pump unit or control means 40 is in fluid communication with load-relieving means 32, e.g., a hydraulic cylinder, via conduit or line 46 for delivering pressurized hydraulic fluid such as oil to load-relieving means 32. Force-responsive means or actuator head 48 is operatively connected to control member 40 via the switch means and electrical connections including electrical cable 44. An electric signal from the switch means incorporated or associated with the force-responsive means actuates the pump for delivering pressurized hydraulic fluid to the load-relieving means. This command or signal from the force-responsive means 48 is issued when torque or force is applied to rotatable member 52 as by a hand turn, which force is substantially concomitantly applied to the adjustment member 16 to effect adjustment thereof, and this signal is uninterrupted as long as torque is continued to be applied to effect adjustment of the adjustment member.

When the load relieving means is actuated, and the piston head 36 is forced against the bottom of the load member 12, the weight or load on the adjustment member 16 is substantially reduced or relieved. The continual application of torque or force to the actuator head 48 is sufficient to concomitantly effect rotation or turning of adjustment member 16 as long as the load on adjustment member 16 is reduced sufficiently. It will be observed that by reason of this force feed-back of the load-relieving means 32, it is possible to adjust the adjustment member 16 with an input force that is nominal only, e.g. by hand or a hand wrench, relative to the load, notwithstanding that the machine supported by the adjustment unit of the invention may weigh hundred's of tons, e.g., 1,000,000 pounds. In this manner, the load may be easily corrected for out-of-level or out-of-flatness condition, without distorting the weight distribution and without the need for extra ordinary lifting and leveling equipment. When the torque applied to the rotatable member is interrupted or stopped, the coiled spring 86 returns the rotatable member 52 back to its neutral position relative to the torquing plate 50, and the signal along electrical conductors 82 and 44 is automatically terminated, thereby shutting off the pump and stopping delivery of hydraulic fluid to load-relieving member 32. The fluid exits from the hydraulic cylinder, and the piston retracts thereby returning all the load to adjustment member 16.

It may be that the cable leading from the male connector 42 to the pump might tend to become twisted as the adjustment means is turned, but attaching a ratchet to the adjustment member to permit turning it in small increments only will avoid placing too great a strain on the cable.

Figure 9:
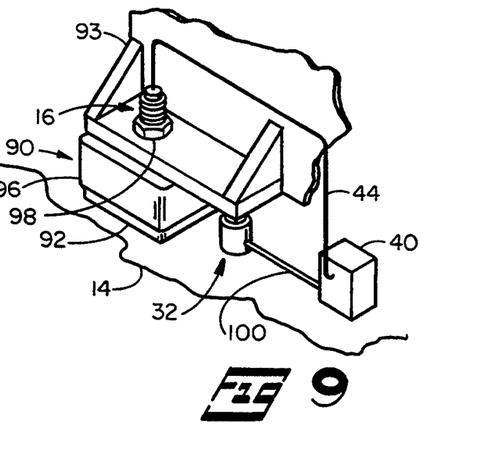
FIG. 9 is a diagrammatic, perspective view of a power assisted adjustment system illustrating an alternative embodiment of the present invention.
Figure 10:
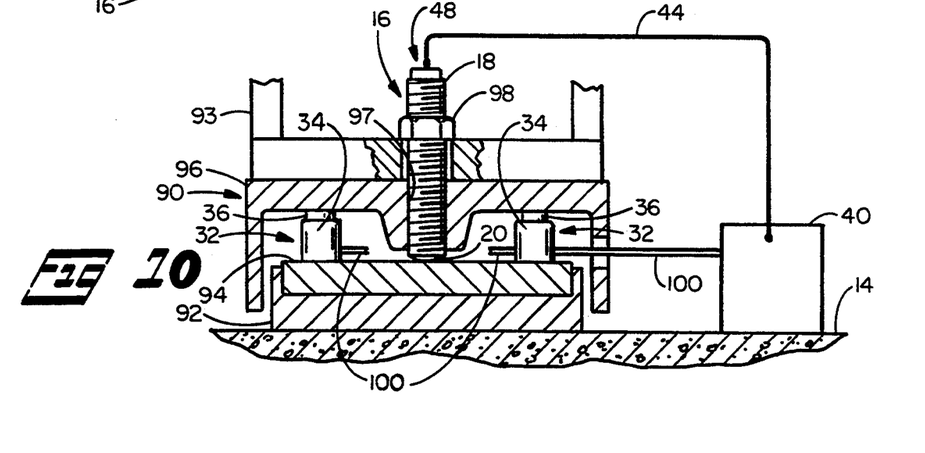
FIG. 10 is a fragmentary elevational view, partly in cross-section, illustrating in greater detail the embodiment of the type shown in FIG. 10.
Figure 11:
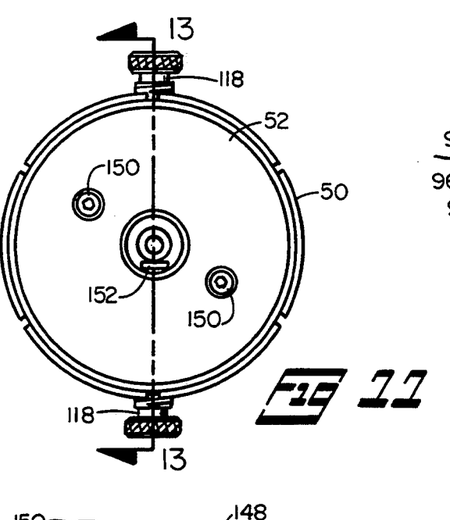
FIG. 11 is a plan view of an alternative embodiment of an actuator head for use in a power assisted adjustment system of the type shown in FIG. 1.
Figure 12:
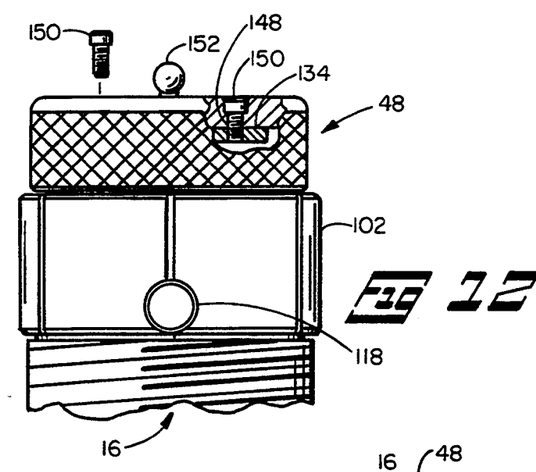
FIG. 12 is a side elevational view of the actuator head of FIG. 11 with a portion broken away to better illustrate certain details.
Figures 13, 14, 15, 16, 17:
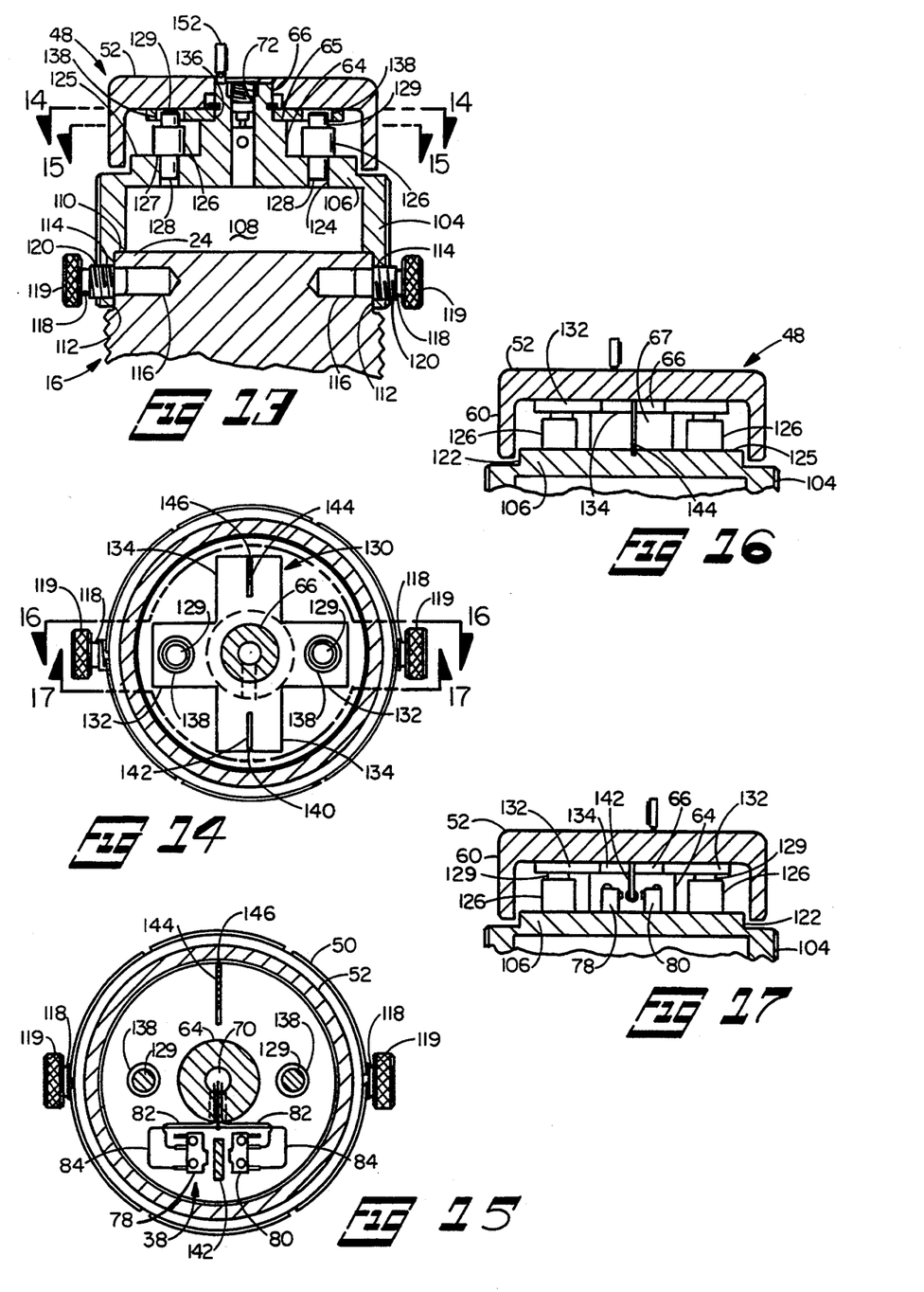
FIG. 13 is a longitudinal sectional view on line XIII—XIII of FIG. 11.
FIG. 14 is a plan sectional view taken on line XIV—XIV of FIG. 13.
FIG. 15 is a plan sectional view taken on line XV—XV of FIG. 13.
FIG. 16 is a longitudinal sectional view taken on line XVI—XVI of FIG. 14.
FIG. 17 is a longitudinal sectional view taken on line XVII—XVII of FIG. 14.

In an alternative adjustment system such as shown in FIGS. 9 and 10, the load member, e.g. machine footing 93, is supported by a mount 90 and therefore is spaced from the base member 14, substantially as shown in U.S. Pat. Nos. 3,332,647 and 4,846,436 cited above. Broadly, in this type of system, the adjustment member 16 threadedly engages a supporting member 96 of sufficient size for supporting the load, e.g. machine footing 93. The bottom end of the adjustment member seats on a bearing member 94 spaced from the base 14 (e.g. floor) by a resilient member 92 disposed on the base member 14. For this type of alternative embodiment utilizing a mount, the load-relieving means may be arranged in parallel with the elements of the mount (i.e., resilient member 92 and bearing member 94) as shown in FIG. 9. Where desired, the load-relieving means 32 are arranged in series as shown in FIG. 10, in that the load-relieving means is disposed intermediate the bearing member 94 (which is seated on resilient member 92) and the supporting member 96, and explained in more detail below. An arrangement in series is sometimes found to be advantageous in that the machine foot is not raised because there is no change of load on the resilient member, and therefore no change of deflection (i.e., compression) of that member when the load-relieving means is actuated, and the adjustment member remains in contact with the bearing member.

As shown in FIGS. 9 and 10, an isolating machinery mount, indicated generally by the numeral 90, incorporates an elastomeric cushion member 92 which is ordinarily compressible and resilient. The cushion member 92 rests on the floor 14 of a building in which a piece of machinery is located (not shown) so that one foot 93 of the machine may be positioned on the mount 90. The cushion member 92 is disposed in immediate supporting relationship below a bearing member or plate 94. A machinery supporting member 96 is arranged or disposed above the bearing member 94, and normally is of such a size that a foot 93 of a machine to be supported thereon will seat or engage the uppermost planar surface thereof. Supporting member 96 is provided with a centrally disposed threaded aperture 97 for threaded engagement with the externally threaded portion 18 of adjustment member 16. In this manner, adjustment member 16 is rotatably engagable with the supporting member 16. The bottom of adjustment member 16 abuts the top surface of the bearing member 94. It will be observed that upon rotation of the adjustment member 16, one can vary the distance between machinery supporting member 96 and the bearing member 94. A locking nut 98 is also provided to fix the adjustment member 16 in place relative to the machinery supporting member 96 upon adjustment of the adjustment member 16.

It will be observed from an examination of FIGS. 9 and 10 that the machinery supporting member 96 is spaced from the building floor 14 which supports the elastomeric cushion 92. Thus, any vibrations transmitted through the floor 14 (or foundation) below the cushion member 92 will be dampened and not fully transmitted to any equipment resting on the machinery supporting member 96. Similarly any vibration or impact forces generated by the operation of a machine resting on member 96 will be only partially transmitted to the floor through mount 90 and adjustment member 16.

As shown in FIG. 10, located adjacent the adjustment member 16 is a load-relieving means 32, which may be a hydraulic cylinder, oriented to engage the bottom side of the machinery supporting member 96 when the piston is activated. It may be desirable to have a plurality of load-relieving members 32 interposed between the bearing member 94 and the machinery supporting member 96, arranged as shown in FIG. 10, so that the downward forces applied by the plurality of load-relieving members to the bearing plate 94 are symmetrical about the center of the resilient member 92 to prevent uneven loading on resilient member 92 and tilting of the bearing member 94. When there is a plurality of load-relieving members 32 within a single machinery mount unit 90, arranged as shown in FIG. 10, each of the load-relieving members 32 is connected through a high pressure line 100 having suitable connecting means and thence to a source of hydraulic fluid such as shown in U.S. Pat. No. 4,846,436. Thus, all of the load-relieving members may be operated simultaneously from the pressure fluid source.

Actuator head or force-responsive means 48 is co-axially mounted with adjustment member 16, as described above. Upon application of input force or torque to rotate actuator head 48, load-relieving means 32 is actuated and substantially concomitantly effects a desired adjustment of adjustment member 16. When the load-relieving means 32 is activated, an increasing upward force is brought to bear on the supporting member 96 and an equal downward force on the bearing member 94 which releases a substantial amount or all of the normal force between the sets of threads engaged between the adjustment member 16 and the support member 96 without reducing the load on or deflection (compression) of the resilient member 92. There is no reduction in deflection of the resilient member because the reduction in load on the adjustment member is achieved by transferring the load to the load-relieving member 32, both of which are supported on the same bearing member which in turn is supported on the resilient member. Thus, a corner of the machine needs to be raised by only the infinitesimal amount corresponding to the reduction of the shear strain distortion in the mating threads of the adjustment member and support member required to permit adjustment of the adjustment member.

An alternative embodiment of the invention is shown in FIGS. 11-17. Broadly, the actuator head includes suitable restraining means which comprises one or more detents or stops extending from the torquing plate to complementary openings in the rotatable member, or a member integral therewith. The openings are of sufficient diameter to permit rotational displacement of the rotatable member relative to the torquing plate until the detent engages or abuts the wall of the opening, and then upon continued application of rotational torque, the restraining means effects rotation to the torquing plate. Because the torquing plate is operably connected to the adjustment member, the two members act in unison, and when the restraining means engages to effect rotation of the torquing plate, the adjustment member is rotated as well.

More specifically, and referring to FIGS. 11-17, actuator head 48 comprises rotatable member 52, similar in construction to that described above, co-operatively engagable with torquing plate 50 fixedly mounted to adjustment member 16. Torquing plate 50 comprises a downwardly depending cylindrical housing 102 having annular side wall 104 and transverse end wall 106, thereby defining cavity or hollow 108, and is adapted to fit over the shank portion 24 of adjustment member 16. (See FIGS. 12 and 13.) The rotatable member 52 is mounted atop the cylindrical housing 102. The lower end of side wall 104 is recessed to provide shoulder 110 and lateral side wall 112 for seating engagement with cylindrical shank 24. Further, side wall 104 is provided with a plurality of threaded holes 114 disposed below the shoulder 110. Diametrically disposed radial holes 116 are located and drilled in shank 24. An interlocking bolt 118 having a knurled head 119 and a threaded subsection 120, is designed to extend through aligned holes 114 and 116, and threadedly engage with threaded holes 114 thereby securing the parts in assembled relation. The pin-like inner end of bolt 118 has a diameter slightly smaller than the inner diameter of hole 116 so as to facilitate a quick connect and disconnect of the parts. It thus will be observed that the torquing plate 50 is fixedly mounted to adjustment member 16 and these parts thereby act in unison. Thus, torque induced to the torquing plate 50 is transmitted directly to the adjustment member 16, and any rotational motion of the torquing plate 50 will effect rotational movement of the adjustment member 16, as described below in more detail.

End wall 106 of torquing plate 50 is provided with a reduced section 122 for accommodating the marginal rim of the skirt 60 when the rotatable member 52 is mounted atop the torquing plate 50, thereby substantially eliminating or minimizing any protruding surfaces. Also, end wall 106 is provided with holes or apertures 124 (see FIG. 13) disposed on opposite sides of central boss 64. Suitable restraining means such as detent or pin 126, each with opposed necked-down ends 128 and 129, and lower ends 128 are press fitted into the holes 124 so that the lower shoulder 127 of each pin 126 abuts the upper planar surface 125 of the transverse wall 106 and thereby providing a secure fit. A horizontally disposed cross-plate 130, comprised of cross arms 132 and 134 substantially normal to each other and central opening 136 at the intersection of the cross arms, seats on shoulder 65. The inner diameter of opening 136 is slightly greater than the diameter of neck 66 so as to permit relative rotational motion between the cross-plate 130 and torquing plate 50. When the cross-plate 130 is seated on shoulder 65, a suitable split ring or snap ring 69 is inserted in a circumferential groove in neck 66 to hold the assembled parts. To each side of central opening 136 in cross arms 132 are holes 138, which are designed to be aligned with holes 124 so that the upper necked-down portion 129 of pins 126 extends into complementary holes 138. It will be observed that the diameters of the upper necked-down portions 129 is smaller than the inner diameter of the holes 138 so as to permit a desired amount, or predetermined amount, of rotational displacement of the cross-plate 130 relative to the torquing plate 50. Upon further rotation of the cross-plate 136, the upper necked-down portion 129 of each detent or pin 126 abuts the interior wall of each hole 138 thereby engaging the torquing plate 50, and continued rotation of cross plate 130 effects rotation of the torquing plate 50.

At or near one end of cross-arm 134 is transverse slot 140, and a flat member 142 oriented vertically depends downwardly from the slot to a sensing means 38 positioned on transverse end wall 106. Thus, rotation of cross-plate 130 will cause flat member 142 to move in rotation about the longitudinal axis of actuator head 48. Two contact switches 78 and 80 are secured to the upper, planar surface 125 of end wall 106 and to each side of flat member 142, so that rotational displacement of the cross-plate 130 relative to the torquing plate 50 will cause the flat member 142 to contact one of the switches 78, 80. Each contact switch is connected to a female electrical receptacle 72 by means of electrical wiring 82 and 84. A male connector 42 in turn is connected to a control means 40 as shown in FIG. 1 (e.g., motor-operated pump) that controls the flow of hydraulic fluid into and out of the hydraulic cylinder 32, substantially as described above. The difference in diameter between holes 138 and the reduced upper end sections 129 of pins 126 is greater than the amount of relative motion required to close the circuit in the contact switches, but less than the amount of relative motion that would damage the switches.

At or near the end of cross-arm 134 opposite to that of slot 140 is suitable bias means such as flat centering spring 144 depending downwardly from slot 146 and secured at its opposed end to transverse end wall 106. Thus, when a torque is applied to the actuator head 48, spring 144 deflects laterally when the cross-plate 130 is rotated relative to the torquing plate 50. When the torque is interrupted or removed, the spring restores the cross-plate 130 to its neutral or nonactivating position relative to the torquing plate 50 so that flat member 142 returns to a neutral position between switches 78 and 80.

Rotatable member 52 is provided with two counter bored holes 148 to match up with two threaded holes 149 in cross-plate 134 such that rotatable member 52 is secured or affixed to the cross-plate 130 by means of two threaded screws 150 which thread into holes 149.

In this manner, when torque is applied to rotate member 52, the cross-plate 130 being integral with member 52 also rotates. A spring loaded cover 152 is attached to the top of rotatable member 52 to cover the female electrical receptacle 72 when the male electrical connector 42 is not engaged with the female receptacle.

When the actuator head 48 is assembled and rigidly affixed to the adjustment member 16, as described above and as shown in the FIGS. 11–17, operation of the system is substantially the same as that described with reference to the other embodiments shown in FIGS. 1–10. Thus, an input force or torque applied to the actuator head 48 to turn the rotatable member 52 either clockwise or counterclockwise, rotates cross-plate 130 and brings flat member 142 into contact with either switch means 78 or 80 (depending upon the direction of rotation), thereby closing the circuit. An electric signal to the control means 40 (e.g. motor-operated pump) actuates the load relieving means 32 and relieves the adjustable member 16 of an increasing portion of the load. The restraining means effects rotational movement of the torquing plate 50, and therefore substantially concomitantly torque is transmitted to the adjustment member 16. When the torque is removed, spring bias means 144 returns the cross-plate 130 to a neutral position.

Figures 18, 19, 20, 21:
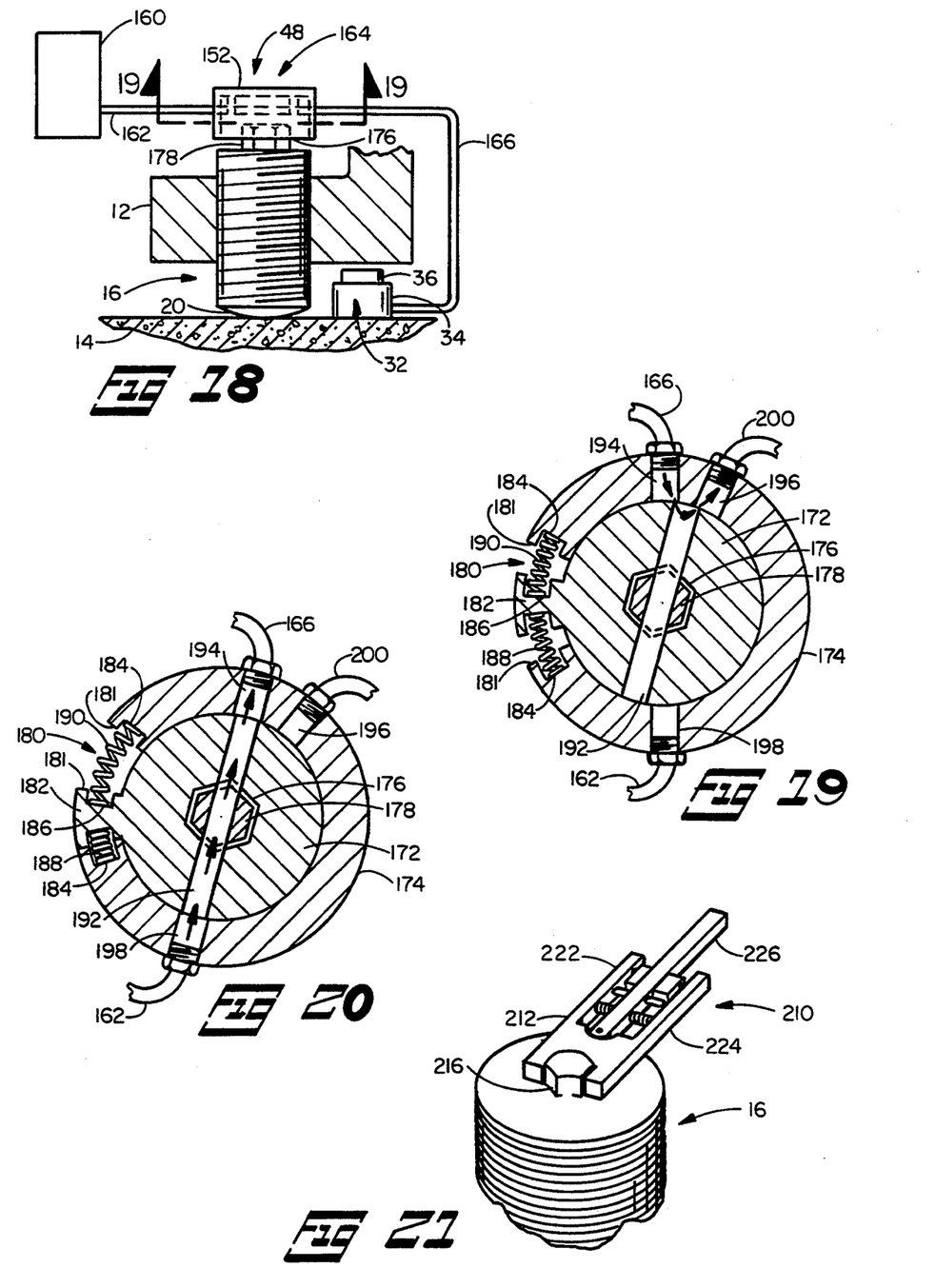
FIG. 18 is a side elevational view, partly in sectional, showing another embodiment of the invention.
FIG. 19 sectional view on line XIX—XIX of FIG. 18.
FIG. 20 is a view similar to FIG. 19 but showing the outer rotatable member rotated clockwise relative to the inner rotatable member.
FIG. 21 a perspective view of an alternative embodiment of the power assisted adjustment system shown in use with the adjustment means

A still further alternative embodiment of the invention is shown in FIGS. 18 and 19. In accordance with this embodiment of the invention, as with the earlier described embodiments, adjustment member 16, having its lower end or bottom 20 resting on base member 14, e.g. a floor, threadedly engages load member 12. Load-relieving means 32, which may be a fluidic or hydraulic cylinder or the like, is located beneath the load member 12 to relieve load on the adjustment member 16 whenever pressure on the cylinder is increased. A source of pressurized fluid from pump 160 is connected to the load-relieving means through input conduit 162, valving means 164, and output conduit 166 to deliver the pressurized fluid to the load-relieving means when rotatable member 174 is rotated, as described below in more detail.

In this particular embodiment, the actuator head 48 includes concentrically arranged annular members comprising torquing member 172 and outer rotatable member 174, with the circumference of the inner member 172 being contiguous with the inside circumference of the rotatable member 174. Further, these two members 172 and 174 are free to rotate relative to one another. The under-surface or lower face of the torquing member 172 is mountable to the top of adjustment member 16, such as by means of a complementary opening 176 in member 172 for accommodating hexagonal head 178 affixed to or integrally formed with the top surface or portion of adjustment member 16. Thus, when the torquing member 172 is rotated, the adjustment member 16 is rotated to the same degree.

As shown in FIGS. 19 and 20, rotatable member 174 has a cutaway or depression 180 in its planar surface having marginal walls 181 for accommodating boss 182 projecting outwardly from the perimeter of inner rotatable member 172. Further, member 174 and boss 182 are provided with opposed complementary recesses 184 and 186, respectively, for seating coiled centering springs 188 and 190, each of which bears upon boss 182 thereby maintaining the boss 182 spaced apart from the marginal walls 181 of cutaway or depression 180. The normal bias of the springs 188 and 190 is predetermined to hold torquing member 172 and rotatable member 174 in a neutral position as shown in FIG. 19.

Torquing member 172 has diametric passageway 192, and is adapted to be selectively aligned with a first radial outlet or port 194 and a second radial outlet or port 196 in rotatable member 174 and with radial inlet or port 198 also in member 174. As best shown in FIGS. 19 and 20, the inlet 198 is connected by way of conduit 162 to pump 160 for supplying fluid (e.g., oil) under pressure through the passageway 192. First outlet 194 is connected by way of conduit 166 to the load relieving means 32, such as a hydraulic cylinder. When the passageway 192, the inlet 198 and the first outlet 194 are aligned (see FIG. 20) as by turning the outer rotatable member 174 in a clockwise direction (described below in greater detail), pressurized fluid is directed to flow from the pump 160 directly through the actuator head 48 to the hydraulic cylinder 32 as shown by the directional arrows. The fluid pressure actuates the hydraulic cylinder-piston member to apply an upward force on load 12, such as a machine resting upon a base or floor, thereby relieving the load on the adjustment member 16. However, when torquing member 172 and rotatable members 174 are in a neutral position, the passageway 192 is out of alignment with inlet 198 thereby closing the inlet, as shown in FIG. 19, but the diameter of the passageway at the opposite end is sufficient to overlap a portion of each of the outlet ports thereby maintaining fluid communication for establishing a drain path as shown by the arrows. Thus, hydraulic fluid drained from the load relieving means 32 passes through first outlet 194, into passageway 192, and then through second outlet 196 leading to conduit 200 into a suitable sump or reservoir (not shown) for subsequently returning the fluid to the pump 160. Rotatable member 174 and torquing member 172 of the actuator head 48 are normally in a neutral position, that is when no torque is being applied to the rotatable member 174, passageway 192 is out of communication (i.e. closed) with inlet port 198. The opposite end of the passageway 192 is in communication with both the first outlet 194 leading to the load relieving means 32 and the second outlet 196 leading to the reservoir. Thus, any fluid in the line leading back from the load relieving means 32 would not be under pressure. Because the rotatable member 174 is rotatable relative to the torquing member 172, the application of torque in a clockwise direction to the rotatable member 174 will bring the passageway 192 into alignment with the inlet 198 and first outlet 194, thereby closing the second outlet 196 to the sump. Fluid under pressure will then flow from the pump 160 through passageway 192 and the first outlet 174, and via conduit 166 to the load relieving means 32 thereby actuating the load relieving means to relieve load on the adjustment member 16. Further, when the rotatable member 174 is turned, as by an operator using nominal force such as hand pressure, the normal bias of the springs 188 and 190 is overcome and the marginal wall of the boss 182 is brought into abutment with the marginal wall 181 of the cutaway 180 thereby transmitting this torque to the torquing member 172. Because the torquing member 172 is operably connected to the adjustment member 16, torque transmitted to the torquing member 172 is thence transferred to the adjustment member. Thus, rotation of the rotatable member 174 results in the substantially concomitant occurrence of actuating the load relieving means 32 to reduce the load on the adjustment member 16, and the adjustment of the adjustment member.

When the torque is removed from the rotatable member 174, the springs return the rotatable member to a neutral position relative to the torquing member 172, thereby closing the inlet 198 and terminating the transmission of fluid from the pump to the load relieving means 32 and further draining fluid from the load relieving means to the sump. It should be noted that in this embodiment a sensing means is not necessary because the load-relieving means is actuated by means of the rotation of the rotatable member 174 relative to torquing member 172.

Figure 22:
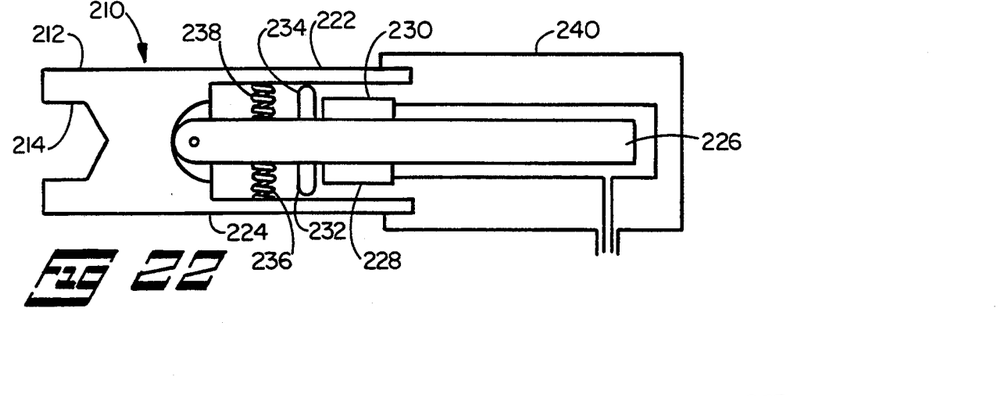
FIG. 22 is a plan view of the embodiment shown in FIG. 21.

The power assisted adjustment system embodying the invention is not limited to a force-responsive means comprising a substantially annular member, e.g. cylindrical cap, wheel, or the like such as of the type described above and co-axially mounted with the adjustment means, but it should be understood that such means may comprise a more conventional form of tool for use in the adjustment system of the invention. Thus, the force-responsive means may be a wrench of a generally conventional structure having a jaw for engaging the adjustment means and a longitudinally extending handle for turning or rotating the wrench as by hand, but modified to be utilized in the system of the invention. One such alternative embodiment utilizing a wrench for applying torque to actuate a load-relieving means and substantially concomitantly adjust the adjustment member is shown in FIGS. 21 and 22. In this embodiment, wrench 210, typically disposed radially with respect to the longitudinal axis of the adjustment means, is provided at one end of the body section 212 with a jaw opening 214 for engaging an hexagonal head 216 formed integrally with the adjustment member 16. Although a jaw of fixed size is shown, it should be understood that the jaw may have an adjustable opening by providing a fixed portion and a movable (adjustable) portion which are known in the art. Thus, adjustment member 16 can be provided with a longitudinally extending engagement post (not shown) and desirably having an integrally formed hexagonal head 216 or other suitable configuration so as to be a complementary fit to jaw 214. The opposed end of body 212 is bifurcated to provide spaced apart, substantially parallel wings 222 and 224. Longitudinal handle 226 is pivotally connected at one end to the body section 212 and extends outwardly from the wings. The handle 226 carries on opposite sides thereof suitable microswitches 228 and 230, and inwardly from the switches are suitable stop means 232 and 234. Coiled springs 236 and 238, seated inwardly of the stop means between the handle and the inwardly disposed surfaces of the wings 222 and 224, maintain the handle in a neutral position. Electric wires 240 carry an appropriate signal from the microswitches to the control means for actuating the load-relieving means or hydraulic cylinder, substantially as described above. With the jaw 214 affixed to head 216, a clockwise rotating or turning force or torque on handle 226 closes switch 228 thereby sending a signal to activate the load-relieving means to relieve the load on the adjustment member, and because stop 232 abuts wing 222, the torque transmitted to body 212 turns the adjustment member 16. When the torque is removed from the wrench, springs 236 and 238, being under tension, return the handle 226 to a neutral position. Where desired, a ratchet 242 may be attached to the jaw section 214 to permit turning in small increments.

Figure 23:
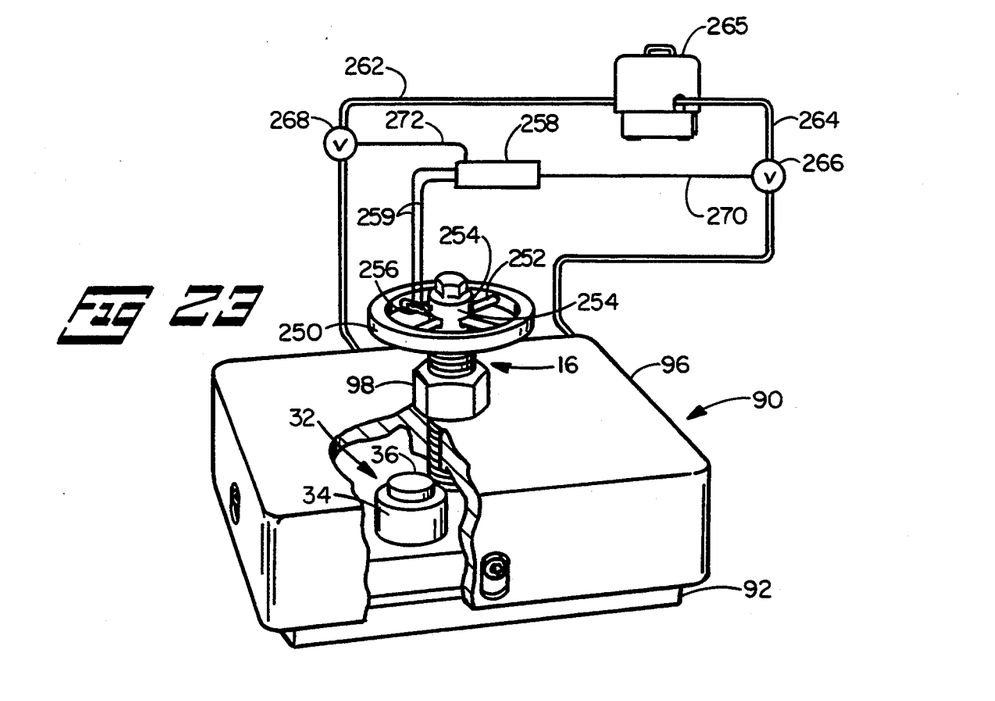
FIG. 23 a diagrammatic perspective view, partly in cross-section, of a power assisted adjustment system illustrating another alternative embodiment of the present invention.
Figure 24:
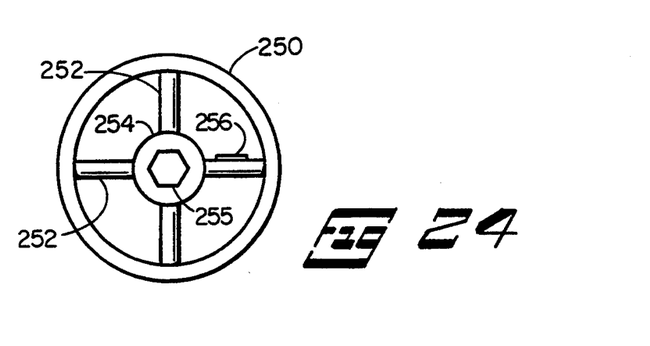
FIG. 24 is a plan view of the actuator head utilized in the embodiment of FIG. 23.

In accordance with the alternative embodiment as shown in FIGS. 23 and 24, the adjustment system comprises, in general, annular actuator head arranged axially with reference to the adjustment member and has a plurality of radial arms or spokes for operably connecting the actuator head to the adjustment means. A strain gauge or other suitable sensing means is disposed on one of the arms, and when torque is applied to the actuator head, a signal is transmitted for actuating the load-relieving means, thereby relieving weight on the adjustment means. Continued turning of the actuator head adjusts the adjustment member with only nominal pressure, and when torque is removed, load is returned to the adjustment means.

More specifically, as shown in FIGS. 23 and 24, a supporting mount 90 of a suitable size so as to support a load such as a machine footing is engageable with adjustment member 16 having an externally threaded section for threadedly engaging an internally threaded section of supporting member 96 (substantially as described with reference to the embodiment shown in FIGS. 9 and 10). Annular actuator head 250, such as a wheel, is disposed coaxially with respect to the longitudinal axis of the adjustment member 16. The actuator head 250 is operably connected to the adjustment member 16 by a plurality of spokes or arms 252 extending radially from the hub 254 to the rim of actuator head 250. The hub 254 is operably connected to the adjustment member 16 by any suitable means such as bolt 255 screw-threaded to the top of the adjustment member. If desired, the radial arms 252 may be removably attached, as by providing the adjustment member with appropriate slots for accommodating one end of the arm and screw threading or bolting the opposite end to the rim of the actuator head. In either case, the actuator head can be assembled and mounted to more than one adjustment member, which can be advantageous where, for example, there is an adjustment member for each of the four footings of a heavy machine.

A strain gauge 256 is attached to one of the radial arms 252 of actuator head 250, and is connected to a suitable power source such as a battery (not shown) and to a control means 258 (e.g. amplifier) via lines 259. Typically, a strain gauge comprises a continuous length of fine resistance wire arranged in back and forth parallel rows, and any change in length will alter the resistance characteristic of the gauge. The stain gauge may be connected to a wheatstone bridge (not shown) normally disposed so that the bridge is balanced and no current flows when no torque is applied to the wrench. Application of torque results in a change in resistance in one leg of the bridge causing current to flow through the bridge to suitable control means to actuate the load-relieving means as describe in the prior embodiments. Thus, when a force or torque is applied to a spoke or arm 252, as by rotating or turning the actuator head 250 clockwise, a torque is transmitted to the engagement means and a bending moment is imposed on the arm at the location of the strain gauge thereby causing the surface of the arm in that location to be strained either in torsion or compression. This strain causes a change in electrical resistance in the strain gauge, which results in an electrical signal to be transmitted to the control means to activate the load relieving means, and substantially concomitantly the torque applied adjusts the adjustment member. Thus, when torque is applied to the actuator head 250, as by an operator applying hand force to turn the wheel, the arm deforms infinitesimally and causes an electrically perceptible change in the resistance of the strain gauge. An inlet line 262 and outlet line 264 extend between the load-relieving means 32 (e.g. hydraulic cylinder) and pump 265, and valve 266 and 268 control the passage of hydraulic fluid in one direction or the other. Control means 258 is electrically connected to valves 266 and 268 via electric wires 270 and 272, respectively. Depending upon the signal received by the control means, one of the valves is opened and the other closed to activate or deactivate the load-relieving means or hydraulic cylinder 32. Thus, application of torque to the actuator head 250 sends a signal to the control means 260 to establish fluid communication with the load-relieving means or hydraulic cylinder 32, and hydraulic fluid is pumped to the load-relieving means, thereby actuating the hydraulic cylinder and relieving load on the adjustment member and substantially concomitantly adjusts the adjustment member. When application of torque to the actuator head is discontinued, the change in signal from the strain gauge deactivates the hydraulic cylinder and returns the load to the adjustment member.

Figure 25:
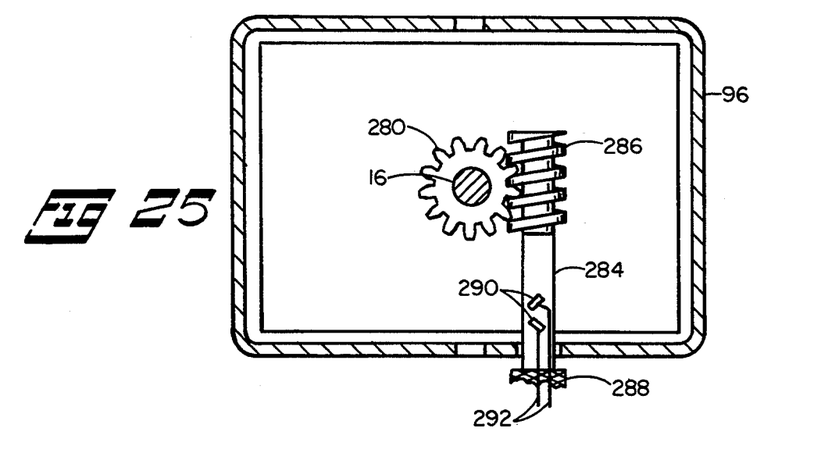
FIG. 25 is a plan view of another alternative embodiment of the present invention.
Figure 26:
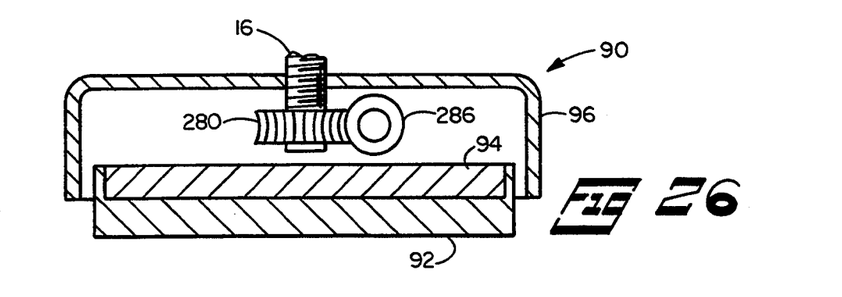
FIG. 26 is a side elevational view, partly in cross-section, of the embodiment of FIG. 25.

In accordance with an alternative embodiment as shown in FIGS. 25 and 26, axial translation of the adjustment member is effected by a worm gear bearing a strain gauge. Adjustment member 16 is provided at one end, either above or below the load member positioned on mounting 90, with a worm wheel or spur gear 280 having radial teeth parallel to the axis of the wheel. The actuator 282 comprises a rotatable shaft 284 having its longitudinal axis disposed transversely to the worm wheel, and having at one end a worm 286 for meshing with the teeth of worm wheel 280. The opposed end of actuator shaft 284 is provided with a knurled knob 288 for turning or rotating the shaft. A strain gauge 290 is positioned along the axis of the shaft 284, and is electrically connected via wires 292 to a control means for operating pump, substantially as described with prior embodiments. Thus, application of torque by turning shaft 284 effects a change is resistance in the strain gauge, thereby activating the load-relieving means (not shown) to relieve load on the adjustment member, and substantially concomitantly effects axial translation of the adjustment member to adjust the positioning of the load, substantially as described above. Interrupting the application of torque to the actuator shaft deactivates the load-relieving means, and transfers back the load to the adjustment member, as described above.

Figure 27:
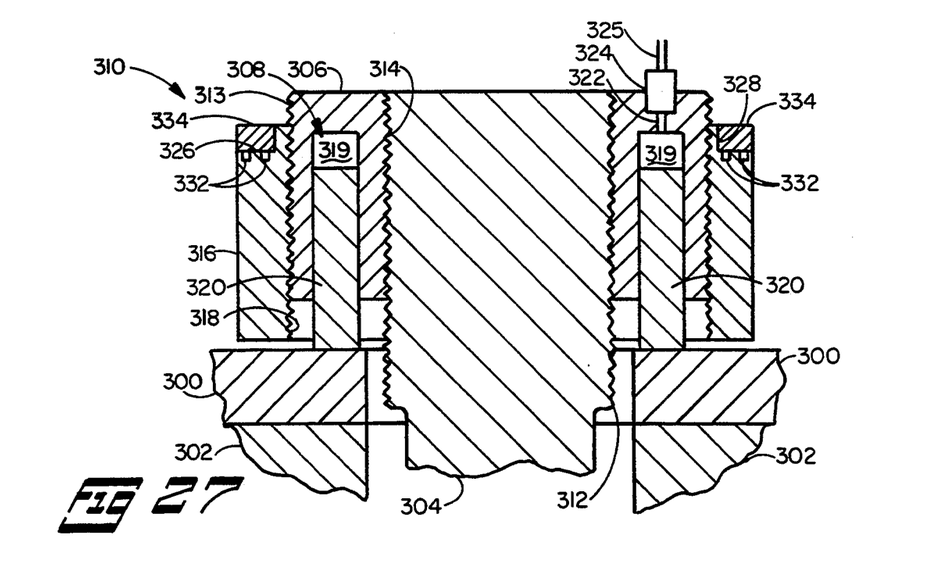
FIG. 27 is longitudinal sectional view of still another embodiment of the present invention.

The adjustment system of the present invention also may be utilized in adjusting a compressing or clamping force such as used for applying a precompressive force on an assembly of structural members. For example, when connecting or clamping together, or otherwise assembling, the crown, column and bed of a punch press or like machines, it is virtually impossible to apply sufficient force or torque to the clamping member such as a tie rod to withstand the operating forces which urge the separation of the crown from the columns and columns from the bed. As shown in FIG. 27, an assembly of structural members 300 and 302 are connected or clamped together by tie rod 304 which is engagable with a concentrically disposed tie rod nut 306 having load-relieving means generally indicated by the numeral 308 and operatively connected to a force-responsive means indicated generally by the numeral 310. Tie rod 304 has an externally threaded end 312 extending outwardly from the assembly. The tie rod nut or hydraulic nut 306, of a circular section, has external, or male, screw threads 313 and internal, or female, screw threads 314. Thus, the internal threaded section 314 of tie rod nut 306 threadedly engages the threaded end 308 of tie rod 304. Annular adjustment member 316 is internally threaded at 318 for engaging the externally threaded section 313 of tie rod nut 306. Tie rod nut 306 includes annular chamber 319, having its longitudinal axis substantially parallel with the longitudinal axis of the tie rod, for accommodating reciprocating piston 320 having one end which seats on or abuts the adjacent structural member 300 of the machine assembly. Annular chamber or cylinder 319 is provided with fluid passageway 322 connected to a quick-disconnect hydraulic converter 324 which is in fluid communication via conduit 325 with a pump or other suitable source (not shown) for providing pressurized fluid to the cylinder 319 to serve as a load-relieving means, substantially as described above. The upper end of adjustment member 316 includes annular recess 326 having a laterally disposed, planar shoulder 328 provided with a plurality of holes for accommodating pins 332 of torquing plate 334. In this manner, the force-responsive means 310 having torquing plate 334 is operably connected to the adjustment means 316 substantially as described above in the prior embodiments.

Suitable actuating means or sensing means (not shown) is operably connected with the force-responsive means 310 so that torque applied to the torquing plate 334 will actuate the actuating means and send a signal (e.g. electric signal from a switch, radio signal, or the like) to the control means for a pump or valve means, substantially as described above in the several foregoing embodiments. Pressurized fluid (e.g., oil) is passed into the annular cylinder 319 of the load-relieving means 308 causing the piston 320 to move against structural member 300 thereby compressing the structural members 300 and 302 and stretching the tie rod 304. The application of torque or force to actuate the load-relieving means in this manner reduces the load on the adjustment member 316, and the torque transmitted substantially concomitantly effects the desired degree of rotation or turning of the adjustment member 316 to apply the proper precompression in the structural members. When the proper level of clamping has been attained, the application of torque to the torquing plate 334 is interrupted or discontinued, thereby deactivating the load-relieving means 308 and transferring back the load to the adjustment member 316.

By reason of this embodiment utilizing a clamping force, the tie rod nut or hydraulic nut 306 is not operated to stretch the tie rod 304 or to compress the structural members 300 and 302 any more than is necessary for moving the adjustment member 316 into a new abutment position against the adjacent structural member 300. As a further advantage, it will be observed that the assembly comprising the tie rod nut 306 having incorporated therein a load-relieving means and the adjustment member 316 with the associated sensing means and fluid supply means is removably attachable to a tie rod, and therefore this single assembly can be utilized on more than one existing tie rod.

It will be observed that by reason of my invention numerous advantages are achieved in adjusting the position or level of a load. Further, it should be understood that the foregoing detailed description has been given for clearness of understanding only, and no unnecessary limitations should be understood therefrom, as modifications will be obvious to those skilled in the art.

What is claimed is:

1. A power assisted adjustment system, comprising:

(a) adjustment means adaptable for assuming a load;
(b) actuable load-relieving means for temporarily reducing the load on said adjustment means;
(c) actuating means for actuating said load-relieving means;
(d) force-responsive means operably connected to said adjustment means and to said actuating means, whereby application of force to said force-responsive means substantially concomitantly
  (i) actuates said load-relieving means to reduce said load assumed by said adjustment means and
  (ii) effects a desired adjustment of said adjustment means, said force being nominal relative to said load.

2. A power assisted adjustment system according to claim 1 including a sensing means operably connected to said force-responsive means for transmitting a signal to said actuating means for actuating said load-relieving means.

3. A power assisted adjustment system according to claim 1 wherein said force responsive means includes a member engagable with said adjustment means and movable relative to said adjustment means between an activating position and a nonactivating position, said actuating means operably connected to said member for actuating said load-relieving means in response to movement of said member to said activating position, and means for engaging said adjustment means upon movement of said member to said activating position to effect adjustment of said adjustable means.

4. A power assisted adjustment system according to claim 3 including means to bias said member to said non-activating position.

5. A power assisted adjustment system according to claim 1 wherein said adjustment means is threadedly engagable with said load and rotatable relative thereto, said adjustment means having a longitudinal axis substantially transverse to said load.

6. A power assisted adjustment system according to any one of claims 1, 2, 3, 4, or 5 wherein said force-responsive means includes a rotatable member engagable with said adjustment means, means operably connected to said force-responsive means for actuating said load-relieving means upon rotation of said rotatable member, and means to engage said rotatable member and said adjustment means to effect rotation of said adjustment means upon rotation of said rotatable member.

7. A power assisted adjustment system according to claim 6 wherein said rotatable member is rotatable relative to said adjustment means between an activating position and a nonactivating position, and including means to bias said rotatable member to said nonactivating position.

8. A power assisted adjustment system according to any one of claims 1, 2, 3, 4 or 5 wherein said load-relieving means includes a fluidic cylinder, and said actuating means includes a source means for delivering pressurized fluid to said cylinder.

9. A power assisted adjustment system according to claim 8 wherein said force-responsive means includes a rotatable member engagable with said adjustment means and rotatable relative to said adjustment between an activating position and a nonactivating position, means operably connected to said force-responsive means for actuating said actuating means upon rotation of said rotatable member, means to engage said rotatable member and said adjustment means to effect rotation of said adjustment means upon rotation of said rotatable member, and means to bias said rotatable member to said nonactivating position.

10. A power assisted adjustment system according to any one of claims 1, 2, 3, 4 or 5 wherein said load-relieving means comprises a fluidic cylinder and including a source means for supplying fluid under pressure to said load-relieving means; valve control means associated with said force-responsive means adaptable for establishing fluid communication between said source means and said load-relieving means; whereby application of force to said force-responsive means opens said valve control means permitting pressurized fluid to flow from said source means to said load-relieving means to actuate said load-relieving means, and effects adjustment of said adjustment means.

11. A power assisted adjustment system according to claim 1 wherein said force-responsive means includes valve means operably connected to a source means for supplying fluid under pressure to said load-relieving means whereby application of force to said force-responsive means causes said valve means to open permitting fluid to flow from said source means to said load-relieving means.

12. A power assisted adjustment system according to claim 10 wherein said force-responsive means comprises a torquing member having a first fluid passageway and operably connected to said adjustment means, and a rotatable member having a second fluid passageway and rotatable relative to said torquing member between an activating position and non-activating position, whereby application of force to said rotatable member to an activated position aligns said first fluid passageway with said second fluid passageway establishing said fluid communication between said fluid source and said load-relieving means.

13. A power assisted adjustment system according to any one of claims 1, 2, 3, 4 or 5 wherein said load-relieving means comprises a fluidic cylinder and including a source means for supplying fluid under pressure to said load-relieving means; said force-responsive means comprises a first rotatable member operably engagable with said adjustment means and having a diametric passageway adaptable for fluid communication with said source means and said load-relieving means, and a second rotatable member concentric with and circumscribing said first rotatable member and rotatable relative to said first rotatable member between an activating position and non-activating position; means for engaging said first and second rotatable members upon rotation of said second rotatable member to an activating position; valve control means associated with said second rotatable member adapted to establish said fluid communication between said source means and said passageway and said load-relieving means, and biased to a closed position when said second rotatable members is in a non-activating position; whereby upon application of force to said second rotatable member to an activating position opening said valve control means, pressurized fluid flows from said source means through said passageway to said load-relieving means to actuate said load-relieving means, and transmitting said force to said first rotatable member to adjust said adjustment means.

14. A power assisted adjustment system according to any one of claims 1, 3, 4 or 5 wherein said force-responsive means comprises (a) a first rotatable member operably engagable with said adjustment means and having a diametric passageway, (b) a second rotatable member concentric with and circumscribing said first rotatable member and rotatable relative to said first rotatable member between an activating position and non-activating position and having an inlet, a first outlet and a second outlet; said inlet in fluid communication with a source of pressurized fluid; said load-relieving means comprising a fluidic cylinder; said first outlet in fluid communication with said load-relieving means; said second outlet in fluid communication with a reservoir; means for biasing said first rotatable member relative to said second rotatable member to close said inlet and maintain a portion of each of said outlets in an overlapping position with a portion of said passageway when no force is applied to the second rotatable member; whereby upon application of force to said second rotatable member to bring said inlet into fluid communication with said first outlet and closing said second outlet, pressurized fluid flows from said source through said inlet, said passageway, and said first outlet to said load-relieving means.

15. A power assisted adjustment system, comprising:
   (a) adjustment means adaptable for assuming a load;
   (b) means adaptable for engaging said adjustment means and having a fluidic cylinder for temporarily reducing the load on said adjustment means when actuated;
   (c) actuating means for actuating said fluidic cylinder;
   (d) force-responsive means operably connected to said adjustment means and to said actuating means, whereby application of force to said force-responsive means substantially concomitantly
      (i) actuates said fluidic cylinder to reduce said load assumed by said adjustment means and
      (ii) effects a desired adjustment of said adjustment means, said force being nominal relative to said load.

16. A power assisted adjustment system according to claim 15 wherein said load comprises two or more structural members, and includes means for assembling said structural members, and said engaging means in step (b) engages said assembling means.

17. A power assisted adjustment system adaptable for adjustably engaging a load assembling means, comprising:
   (a) adjustment means adaptable for bearing a load;
   (b) an annular member adaptable for engaging said assembling means and having an annular chamber for accommodating a fluidic cylinder for temporarily reducing the load on said adjustment means when actuated;
   (c) actuating means for actuating said fluidic cylinder;
   (d) force-responsive means operably connected to said adjustment means and to said actuating means, whereby application of force to said force-responsive means substantially concomitantly
      (i) actuates said fluidic cylinder to reduce said load assumed by said adjustment means and
      (ii) effects a desired adjustment of said adjustment means, said force being nominal relative to said load.

18. A power assisted adjustment system according to claim 17 wherein said assembling means includes an externally threaded section, and said annular member includes an internally threaded section for threadedly engaging said threaded section of said assembling means.

19. A power assisted adjustment system according to claim 18 wherein said annular member includes an externally threaded section, said force-responsive means comprises a rotatable annulus having an internally threaded section for threadedly engaging said externally threaded section of said annular member, and said actuating means operably connected to said rotatable annulus for actuating said fluidic cylinder upon rotation of said rotatable annulus.

20. A power assisted adjustment system according to any one of claims 1, 2, 3, 4 or 5 wherein said force-responsive means comprises a wrench adaptable for disposition radially relative to said adjustment means, means integral with said adjustment member and adaptable for engagement by said wrench, and sensing means operably connected to said wrench whereby turning said handle transmits a signal to said actuating means for actuating said load-relieving means.

21. A power assisted adjustment system according to claim 20 wherein said wrench includes a jaw means and a handle extending longitudinally from said jaw means, said jaw means adaptable for engaging said means integral with said adjustment means, and said actuating means includes a strain gauge operably connected with said handle.

* * * * *